United States Patent [19]
Craig et al.

[11] Patent Number: 5,377,624
[45] Date of Patent: Jan. 3, 1995

[54] ABALONE FARMING SYSTEM

[75] Inventors: Richard K. Craig; Benjamin E. Beede, both of Goleta, Calif.

[73] Assignee: The Cultured Abalone Incorporated, Goleta, Calif.

[21] Appl. No.: 58,923

[22] Filed: May 7, 1993

[51] Int. Cl.$^6$ .............................................. A01K 61/00
[52] U.S. Cl. ..................................................... 119/234
[58] Field of Search ............... 119/204, 205, 234, 236, 119/245, 247, 248, 250, 251, 269, 225

[56] References Cited

U.S. PATENT DOCUMENTS

| | | | |
|---|---|---|---|
| 301,285 | 7/1884 | Schmitz | 119/234 |
| 1,564,903 | 12/1925 | Shephard | 119/225 X |
| 3,122,126 | 2/1964 | Yamada | 119/225 |
| 3,981,273 | 9/1976 | Buss | 119/225 |
| 4,253,418 | 3/1981 | Lockwood et al. | 119/236 |
| 4,257,351 | 3/1981 | Scura et al. | 119/234 |
| 5,189,981 | 3/1993 | Ewald, Jr. | 119/225 |

Primary Examiner—Gene Mancene
Assistant Examiner—Thomas Price
Attorney, Agent, or Firm—Kelly, Bauersfeld & Lowry

[57] ABSTRACT

An abalone farming system includes an indoor hatchery and an out-of-doors growout area which each utilize a plurality of horizontally elongated tanks in which the abalone are raised. These elongated tanks are stacked along a common vertical plane and arranged such that seawater provided at one end of an upper tank flows the entire length of that tank before cascading to a next lower adjacent tank, wherein the water flows the entire length of that tank before cascading to a next adjacent lower tank, and so forth until the water is discharged to a seawater discharge line. Each tank is provided with an air bar which extends the entire length thereof for aerating the seawater flowing through the tank, and a plurality of plates which are configured to increase the grazing area for the abalone and for dividing the area within the tank into distinct cells. A holding tank is utilized to supply water to both the hatchery and growout area. Water supplied from the holding tank to the hatchery is filtered, subjected to ultraviolet sterilization and temperature controlled. Seawater in the discharge line can be reclaimed and recirculated, thus permitting the abalone farming system to be modified into a partially closed loop system, if necessary.

35 Claims, 4 Drawing Sheets

ABALONE FARMING SYSTEM

BACKGROUND OF THE INVENTION

This invention relates generally to marine hatcheries and related equipment and processes. More specifically, the present invention concerns an abalone farming system which utilizes horizontally elongated, vertically stacked culturing tanks.

Abalone, a rock-clinging gastropod mollusk that has a flattened shell slightly spiral in form, lined with mother-of-pearl, and with a row of apertures along its outer edge, has increasingly become a sought-after delicacy in many fine restaurants. This has led, in recent years, to the creation of abalone farms, wherein the abalone are hatched, raised to maturity and then sold to restaurants and restaurant suppliers.

Most abalone farms are located adjacent to a salt water source, such as an ocean, and include a hatchery and a separate growout unit. In the hatchery, the abalone are grown in tanks under controlled conditions to a size between 0.25 inch and 0.50 inch diameter. The abalone are then transferred to the growout area where conditions are less controlled and are grown there to a size typically between 2.00 inches and 3.25 inches diameter.

In prior abalone farming systems, the hatchery is often located within a building equipped with large racks for supporting large, typically circular water basins. These water basins provide growing tubs in which the baby mollusks feed on algae during the initial growth phase. An end of an air tube is often placed into the seawater in these basins to help aerate the water to provide a suitable growing environment for the young abalone.

After the young abalone have reached a sufficient size (0.25 inch to 0.50 inch diameter), they are transferred to outdoor growout tanks. These are typically large rectangular seawater catch basins which are supplied with kelp on which the abalone feed, as well as the algae which grows therein. These large outdoor water basins require much land because, unlike the tubs within the hatchery, they are not stacked one upon the another.

One drawback of prior abalone farming techniques lies in the space required to setup an efficient farming operation. Due to the nature of the tubs utilized in prior hatcheries, the hatchery itself must often be located in a multi-story building, wherein access to the upper tubs is available only by means of ladders. The outdoor growout area is, further, extraordinarily large in order to provide sufficient grazing area for the abalone. In both the hatchery and the growout area, control over the conditions under which the abalone are being raised is often less than ideal simply because the tanks are large, deep and inaccessible to ordinary inspection.

Accordingly, there has been a need for a novel abalone farming system which uses culturing tanks that provide a higher surface area for grazing than the prior hatchery tubs and growout area basins. Additionally, a need exists for an efficient abalone farming system which is at least partially self-cleaning, permits the abalone to be conveniently collected in a single location after being anesthetized, and provides closer control over algae growth within the tanks. Moreover, such a system is needed which permits control over water temperature and water quality. The present invention fulfills these needs and provides other related advantages.

SUMMARY OF THE INVENTION

The present invention resides in an abalone farming system which provides for much better space utilization than similar prior systems. The abalone farming system comprises, generally, a hatcher which includes a first set of vertically stacked, horizontally elongated tanks having a water supply at a first end of a top tank, and a growout area which includes a second set of vertically stacked, horizontally elongated tanks also having a water supply at a first end of a top tank thereof. The water supplies of the first and second sets of vertically stacked tanks are connected to a seawater source, and an outlet is provide for discharging seawater from the first and second sets of vertically stacked tanks. A recirculation system permits discharged seawater to be selectively reclaimed at the outlet and fed back to the water supply of the hatchery.

In a preferred form of the invention, the tanks of both the hatchery and the growout area have a first end and a drain at a second end thereof. The water supply is provided at the first end of a top tank, and a water discharge outlet is provided at the second end of the bottom tank. Means are provided for directing water flow through the plurality of stacked tanks from the water supply to the water discharge outlet in a manner causing the water to flow the length of each elongated tank and cascade from an upper tank to a next lower tank successively from the first end to the second end.

The stacked tanks are aligned along a common vertical plane, and are arranged such that the second end of each tank is aligned with and directly below the first end of the next adjacent upper tank, and such that the first end of each tank is aligned with and directly below the second end of the next adjacent upper tank. Each drain includes a standpipe for controlling the level of water within the tank.

Means are provided for aerating water within each tank in the form of an air bar placed on the bottom of each tank and which extends the length thereof. Air for the air bar is supplied from a common air manifold adjacent to each stack of tanks.

The water supply for the hatchery includes a supply line having means for aerating water upon its discharge from the supply line. This aerating means includes a fan sprayer.

Plate means are provided within each tank for increasing the grazing area for the abalone. In the hatchery, the plate means comprise a plurality of spaced, submerged ceramic tiles. Alternatively, these plates may be arranged within the tanks to create distinct cells. In the growout unit, the plate means forms a lattice-like structure within the tank. Divider plates are arranged within each tank for restricting migration of abalone. The plate means in the growout tanks may comprise concrete dividers which are arranged and function much like the ceramic tiles in the hatchery tanks.

Seawater is provided at the water supply for the hatchery which has been previously heated, filtered and sterilized. The seawater provided the growout area is, in contrast, unfiltered and unsterilized. In this regard, a system for conditioning the seawater prior to its being fed into the hatchery is provided, which includes means for filtering, providing ultraviolet light sterilization, and for controlling the temperature of the seawater.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
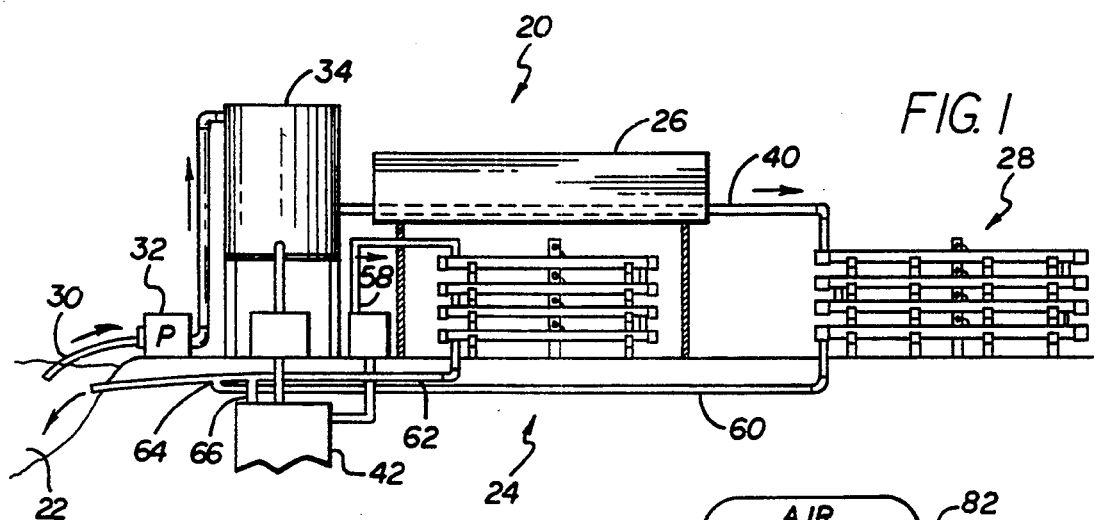
FIG. 1 generally illustrates the abalone farming system of the present invention, wherein seawater is pumped into a holding tank which supplies both a sheltered hatchery and an out-of-doors growout area.
Figure 2:
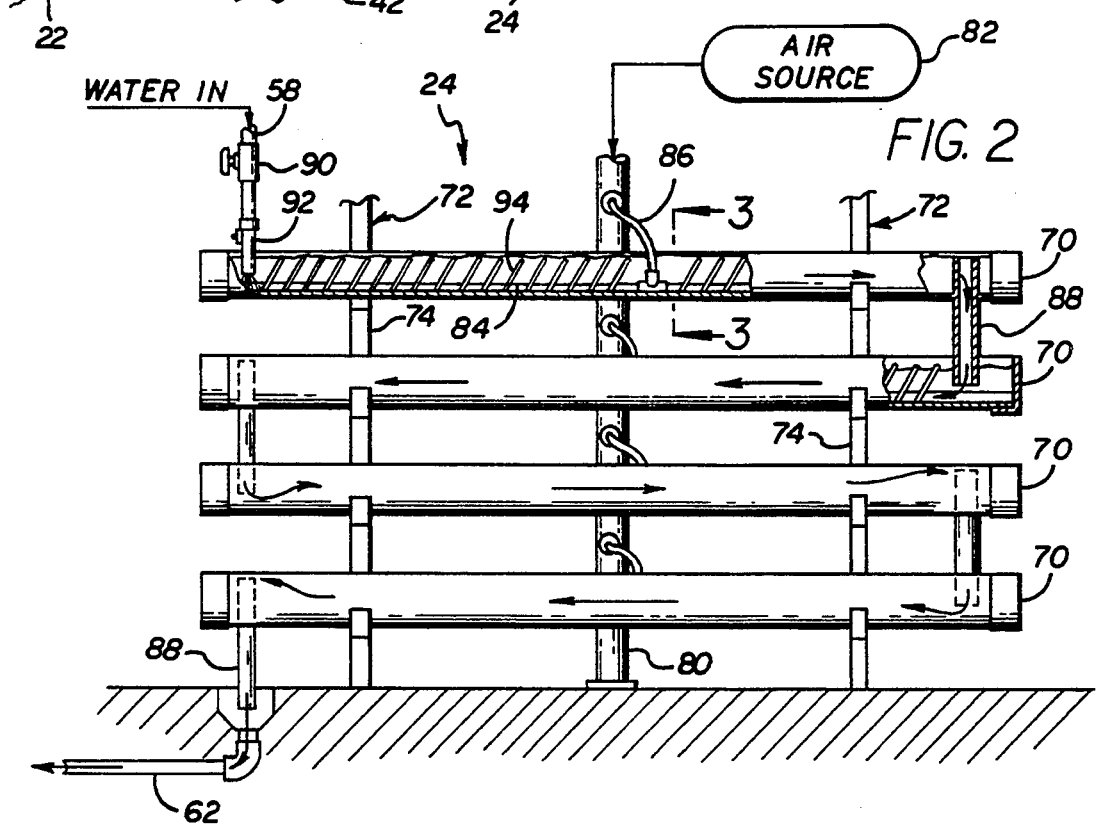
FIG. 2 is an enlarged elevational view of a plurality of vertically stacked tanks, shown in the hatchery of FIG. 1.
Figure 3:
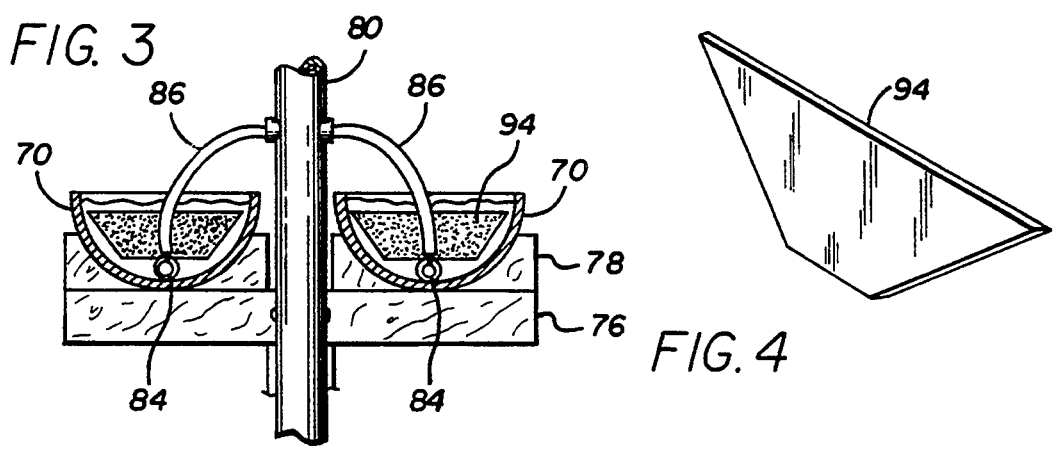
FIG. 3 is an enlarged vertical section taken generally along the line 3—3 of FIG. 2.
Figure 15:
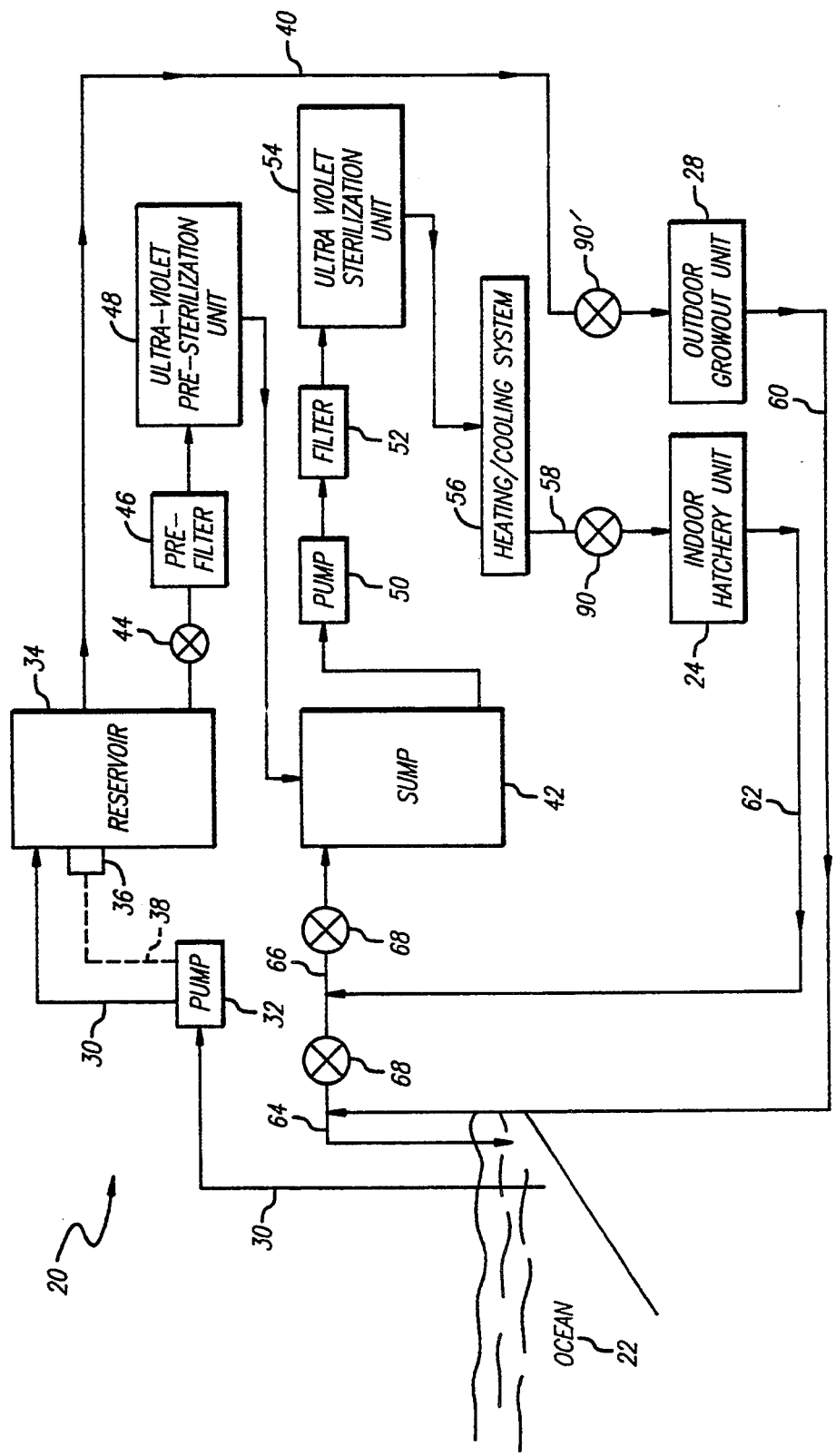
FIG. 15 is a diagrammatic representation of the flow of seawater through the abalone farming system and of the manner in which seawater is conditioned prior to being supplied to the hatchery.

As shown in the drawings for purposes of illustration, the present invention is concerned with an abalone farming system, generally designated in FIGS. 1 and 15 by the reference number 20. The abalone farming system 20 is usually located adjacent to a seawater source, such as the ocean 22, and includes a hatchery 24 within a suitable shelter 26, and a growout area 28. Within the hatchery 24, the abalone are nurtured, under controlled conditions, until they are between 0.25 inch and 0.50 inch in diameter. At that point the abalone are transferred to the growout area 28 where they are typically grown to a size of about 3.25 inches in diameter.

In accordance with the present invention, seawater is drawn from the ocean 22 through an inlet line 30, and a pump 32 feeds the seawater into a holding tank 34. The holding tank 34 provides a seawater reservoir for use in the abalone farming system 20, and a level sensor 36 is provided within the holding tank 34 which provides a signal via an electrical line 38 to the pump 32 to activate and deactivate it as required to maintain the seawater level within the holding tank 34 at an optimum level. Seawater is gravity fed from the holding tank 34 through an untreated seawater inlet line 40 to the growout area 28 (see FIGS. 1, 5 and 15). In contrast, the seawater within the holding tank 34 is gravity fed into a sump 42 and conditioned prior to being fed into the hatchery 24.

With reference to FIGS. 1 and 15, a valve 44 controls the flow of seawater from the holding tank 34 to the sump 42. A prefilter 46 and an ultraviolet pre-sterilization unit 48 are provided intermediate the holding tank 34 and the sump 42 to provide the first steps for conditioning the seawater for the hatchery 24. A secondary pump 50 is provided for pumping the pre-treated seawater within the sump 42 through another filter 52, another ultraviolet sterilization unit 54 and through a heat pump 56 which stabilizes the temperature of the seawater at about 15° C. prior to its being fed into the hatchery 24 through a treated seawater inlet line 58.

The abalone farming system 20 has the ability to recirculate, if desired, seawater discharged from the hatchery 24 back to the sump 42. In this regard, separate seawater discharge lines 60 and 62 are provided from, respectively, the growout area 28 and the hatchery 24. These discharge lines 60 and 62 join together at a junction 64 after which discharge seawater from both the hatchery 24 and the growout area 28 are shunted together back to the ocean 22. A recirculation line 66 is provided in the seawater discharge line 62 for the hatchery 24, before the junction 64, to permit, if desired, some or all of the treated seawater to be recirculated back into the sump 42. The flow of the discharged treated seawater from the hatchery 24 through the discharge line 62 is controlled by means of two valves 68 (FIG. 15).

With reference now to FIGS. 2–4, 13 and 14, the construction of the hatchery 24 will be described in greater detail. The hatchery 24 includes one or more stands of horizontally elongated, vertically stacked tanks 70. The tanks 70 are manufactured from 12 inch diameter, ten feet long PVC pipe which has been cut in half, wherein the ends have been sealed to hold water. The tanks 70 are held in spaced vertical alignment with one another on a pair of support racks 72. As shown best in FIGS. 2 and 3, the support racks 72 comprise a vertical beam 74 and horizontally outwardly extending cross arms 76 which provide support for wedges 78 which engage and cradle an undersurface of a supported tank 70.

An air manifold 80 extends vertically along the side of the stand of vertically stacked tanks 70 and is connected to an air source 82. An air bar 84 is positioned within each tank 70 and extends substantially the entire length thereof. The air bar 84 is connected to the air manifold 80 by means of a flexible supply hose 86. The air bar 84 includes apertures spaced along the length thereof for the purpose of aerating water within the tanks 70.

Each tank 70 is also provided with a standpipe 88 adjacent to one end thereof, which serves as a drain for the tank and which also regulates the water level within the tank. The tanks 70 are arranged such that the standpipe 88 for an upper tank directs treated seawater into an end of a next adjacent lower tank 70 opposite to the end wherein its standpipe 88 is located. This ensures that treated seawater received into an upper tank at an end thereof opposite its standpipe 88, flows the entire length of that upper tank to the standpipe 88, where it is directed downwardly to the next adjacent tank, wherein the seawater is caused to flow the entire length of that tank to its standpipe, and so on in a cascading fashion to the seawater discharge line 62.

The treated seawater inlet line 58 is provided a valve 90 by which the flow of seawater into the hatchery 24 may be controlled. The end of the treated seawater inlet line 58 is fitted with a fan sprayer 92 to further increase aeration of the treated seawater on its entry into the upper tank 70 of the hatchery 24.

Figure 4:
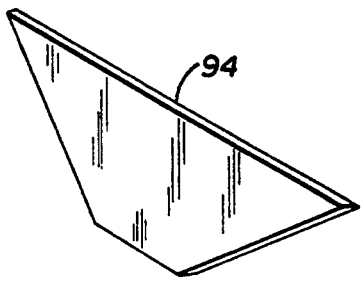
FIG. 4 is an enlarged perspective view of a typical ceramic tile plate situated within the hatchery tanks illustrated in FIGS. 2 and 3.

Spaced roughly equidistantly from one another within each tank 70 are ceramic tile plates 94 (FIG. 4). These plates are positioned at an angle within the tanks 70 and are supported by the walls thereof above the air bar 84. The plates 94 are configured to be entirely submerged within the treated seawater of the tanks 70 of the hatchery 24 to increase the grazing area for the abalone.

Figure 13:
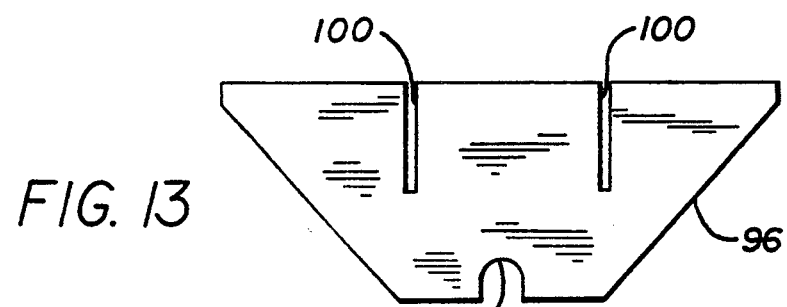
FIG. 13 is an elevational view of a PVC plate which may be utilized within the hatchery tanks in lieu of the ceramic tile plate illustrated in FIG. 4.
Figure 14:
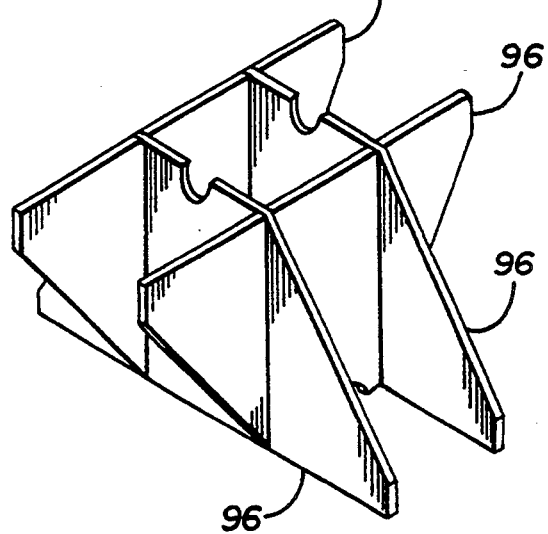
FIG. 14 illustrates the manner in which the PVC plate of FIG. 13 may be assembled with other such plates, prior to being placed within the hatchery tanks to create cells therein.

An alternative plate design utilized in the hatchery 24 is illustrated in FIGS. 13 and 14. FIG. 13 illustrates a PVC hatchery plate 96 having a notch 98 and a pair of slots 100. Four of the PVC plates 96 are assembled as shown in FIG. 14 to one another, and the assembly may then be placed within the hatchery tanks 70 in lieu of or in addition to the ceramic tile plates 94. These assembled PVC plates 96 provide additional grazing area for the abalone, and create distinct cells which limit migration of the abalone along the length of the tanks 70. This gives the abalone farmer greater control over the growth of abalone within the hatchery 24.

The growout area 28 of the abalone farming system 20 will now be described in greater detail with reference to FIGS. 5-12. In the discussion of the growout area 28, elements similar to those found in the hatchery 24 described above will receive like reference numbers with a prime (') designation.

Figure 5:
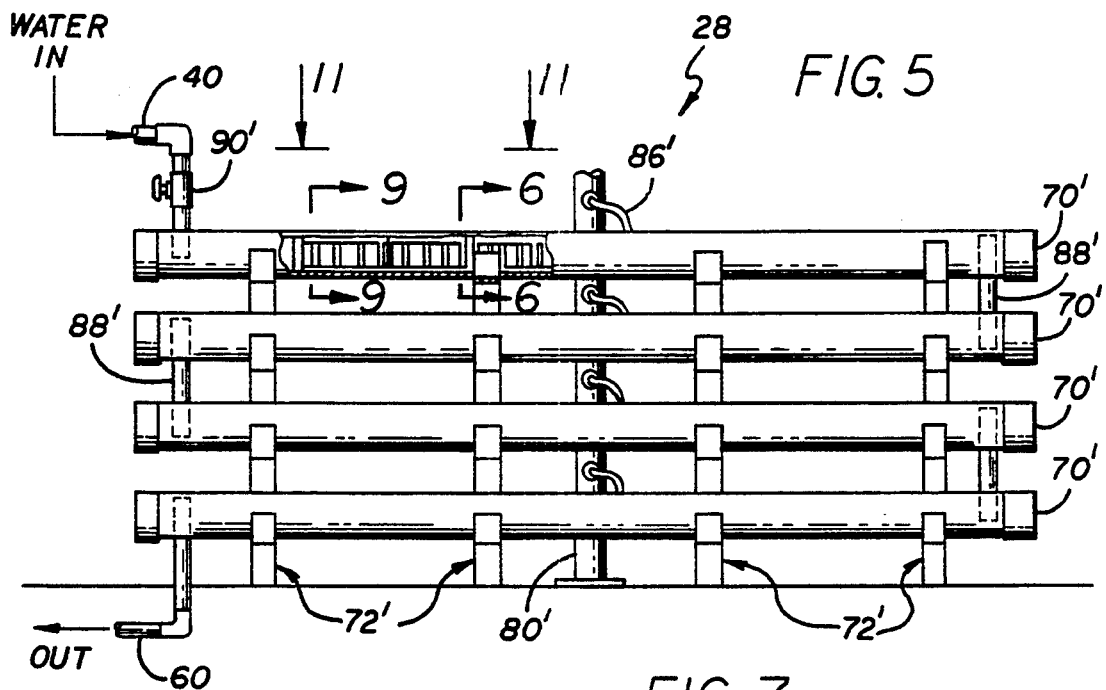
FIG. 5 is an elevational and partially sectional view of a plurality of vertically stacked tanks, shown in the growout area of FIG. 1.

As shown in FIG. 5, the growout area 28 includes one or more stands of vertically aligned tanks 70'. These tanks 70' are preferably constructed from 20 inch diameter, 20 feet long PVC pipe segments which are cut in half and which have the ends sealed. Because these tanks 70' are larger and carry a larger volume of seawater than the tanks 70 within the hatchery 24, four support racks 72' are provided for supporting the tanks 70' in the desired vertically stacked alignment.

Again, an air manifold 80' extends vertically adjacent to the stand of vertically aligned tanks 70' and is connectable to an air source. An air bar 84' extends within each tank 70' substantially the entire length thereof, and is connectable to the air manifold 80' by means of an air hose 86'.

Each growout tank 70' includes a standpipe 88' which serves the same function as the standpipes 88 described above. In the growout area 28, water received from the untreated seawater inlet line 40 is controlled by means of a valve 90', and is caused to flow substantially the entire length of the growout tanks 70' and cascade downwardly from one tank to a next adjacent lower tank, and ultimately to the seawater discharge line 60.

Figure 6:
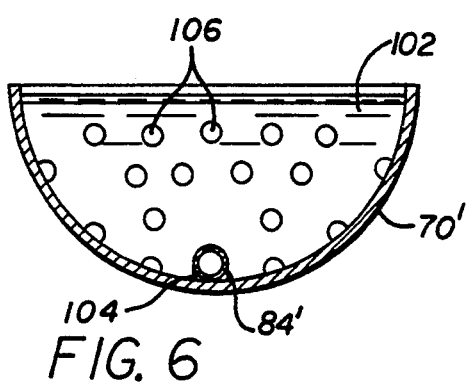
FIG. 6 is an enlarged sectional view taken generally along the line 6—6 of FIG. 5, illustrating the positioning and configuration of a divider plate within a growout tank.
Figure 7:
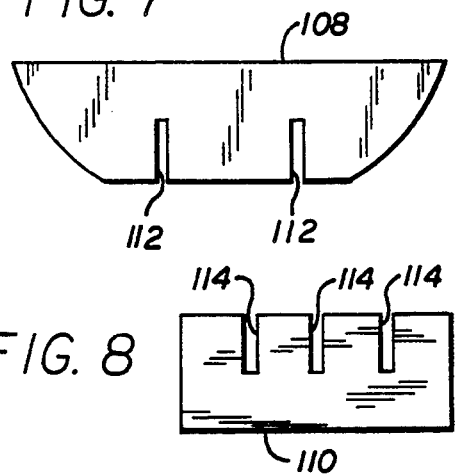
FIG. 7 is an elevational view of a baffle plate.
Figure 8:
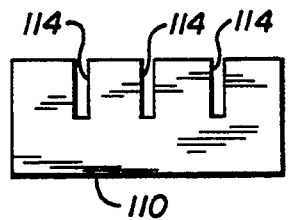
FIG. 8 is an elevational view of a spacer plate.

With reference to FIGS. 6-9 and 11, a number of different types of plates are placed within the growout tanks 70' to increase the grazing area for the abalone and to control migration of the abalone through the length of the tanks 70'. FIG. 6 illustrates a concrete dividing plate 102 which is provided with a notch 104 and a number of apertures 106. The notch 104 is intended to be placed over the air bar 84', and the dividing plate 102 is configured to substantially fill a cross-sectional segment of the tank 70'. The water level of the seawater within the growout tank 70' is below the top of the dividing plate 102 thus requiring the seawater within the growout tank to flow through the apertures 106. The dividing plates 102 are preferably spaced about every two feet along the length of the growout tanks 70'.

Figure 9:
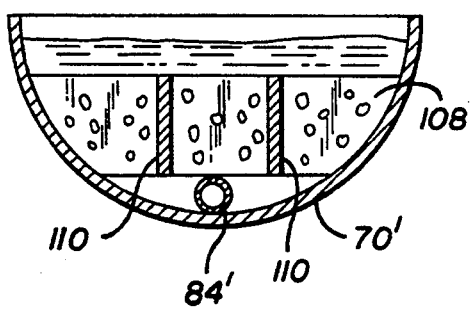
FIG. 9 is an enlarged sectional view taken generally along the line 9—9 of FIG. 5, wherein assembled baffle and spacer plates are illustrated within the growout tank.
Figure 11:
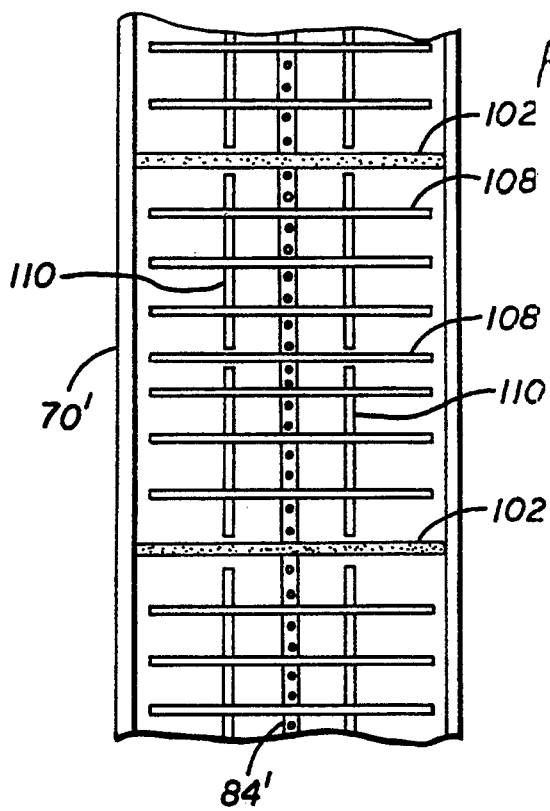
FIG. 11 is a top plan view of a portion of a growout tank taken generally along the line 11—11 of FIG. 5, illustrating the manner in which the baffle and spacer plates, when assembled, are positioned between dividing plates within the tank.

Situated between the dividing plates 102 are a plurality of baffle plates 108 (FIG. 7) and spacer plates 110 (FIG. 8) which are assembled to one another in a crisscross fashion by placing the slots 112 of the baffle plates 108 into engagement with the slots 114 of the spacer plates 110 (see FIGS. 9 and 11). Typically, two such assemblies of three baffle plates 108 and two spacer plates 110 will be placed between two adjacent dividing plates 102 within the growout tanks 70'. These assemblies are intended to be completely submerged within the seawater flowing within the growout tank 70'. As seen in FIG. 11, one additional baffle plate 108 is placed between these assemblies and held in abutting relation between two spacer plates 110.

Figure 10:
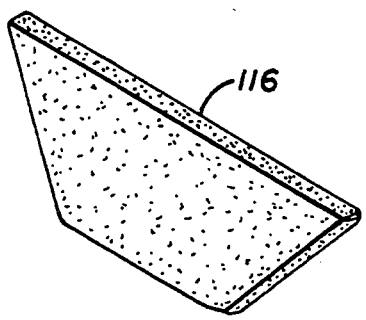
FIG. 10 illustrates a concrete dividing plate which can be utilized within the growout tanks in lieu of the plates illustrated in FIGS. 6–9.

FIG. 10 illustrates an alternative plate 116, which is similar to the ceramic tile plates 94 but is made of concrete, which can be used in addition to or in lieu of the plates illustrated in FIGS. 6-9. The concrete plate 116 would be arranged within the growout tanks 70' in much the same manner as the ceramic tile plates 94 illustrated in connection with the hatchery 24.

Figure 12:
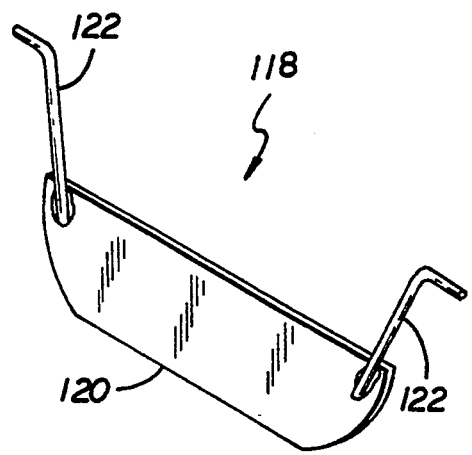
FIG. 12 illustrates yet another alternative baffle plate which may be positioned utilizing hangers within the growout tank.

Another alternative plate design which may be utilized in the growout tanks 70' is illustrated in FIG. 12. This alternative plate 118 is preferably constructed of PVC and includes a baffle section 120 and a pair of hangers 122 which may be supported from an upper edge of the tank 70'. When this alternative plate 118 is utilized, holes or grooves (not shown) are provided in the upper edge of the growout tanks 70' to securely position the plate 118 in a desired location.

From the foregoing it is to be appreciated that the improved abalone farming system 20 includes a novel tank design that provides raceways for the seawater which, in effect, provides a higher surface area for grazing. The stands of vertically supported and aligned tanks 70 and 70' permit far greater space utilization than prior abalone farming systems and, by their very nature, are partially self-cleaning. The design of the tanks 70 and 70' enhance algae growth, and permit improved observation of the growth of the abalone and manipulation thereof.

Although particular embodiments of the invention have been described in detail for purposes of illustration, various modifications may be made without departing from the spirit and scope of the invention. Accordingly, the invention is not to be limited, except as by the appended claims.

We claim:

1. An abalone farming system, comprising:

a plurality of elongated, vertically stacked tanks, each having a first end and a drain at a second end thereof;

a water supply at the first end of a top tank;

a water discharge outlet at the second end of a bottom tank;

means extending the length of each tank for aerating water within the tank; and means for directing water flow through the plurality of elongated, vertically stacked tanks, from the water supply to the water discharge outlet, in a manner causing the water to flow the length of each elongated tank and cascade from an upper tank to a next lower tank successively from the first end to the second end.

2. An abalone farming system as set forth in claim 1, wherein the tanks are arranged such that the second end of each tank is aligned with and directly below the first end of a next adjacent upper tank, and the first end of each tank is aligned with and directly below the second end of the next adjacent upper tank.

3. An abalone farming system as set forth in claim 1, wherein the water supply includes a supply line having means for aerating water upon its discharge from the supply line.

4. An abalone farming system as set forth in claim 3, wherein the aerating means includes a fan sprayer.

5. An abalone farming system as set forth in claim 1, including a plurality of spaced, removable plates arranged within each tank.

6. An abalone farming system as set forth in claim 5, wherein the plates comprise submerged ceramic tiles.

7. An abalone farming system as set forth in claim 5, wherein the plates are arranged to create distinct cells within the tank.

8. An abalone farming system as set forth in claim 1, wherein each drain includes a standpipe for controlling a level of water within the respective tank.

9. An abalone farming system as set forth in claim 1, including a system for conditioning seawater prior to its being fed into the top tank through the water supply.

10. An abalone farming system as set forth in claim 9, wherein the conditioning system includes means for filtering the seawater.

11. An abalone farming system as set forth in claim 10, wherein the conditioning system includes ultraviolet light sterilization of the seawater.

12. An abalone farming system as set forth in claim 11, wherein the conditioning system includes means for controlling the temperature of the seawater.

13. An abalone farming system as set forth in claim 1, including means for recycling seawater from the water discharge outlet back to the water supply to create a water feedback loop.

14. An abalone farming system as set forth in claim 1, wherein the plurality of elongated, vertically stacked tanks are placed within a shelter to form an abalone hatchery, and wherein a second similar plurality of elongated, vertically stacked tanks are placed out-of-doors to provide a growout area for abalone transferred from the hatchery.

15. An abalone farming system as set forth in claim 14, wherein seawater provided at the water supply for the hatchery is filtered and sterilized, and wherein seawater provided at the water supply of the growout area is unfiltered and unsterilized.

16. An abalone farming system, comprising:

a first horizontally elongated tank having a water inlet and a drain spaced horizontally from the water inlet;

a second horizontally elongated tank stacked vertically and directly below the first tank, having a water inlet and a drain spaced horizontally from the water inlet;

means for directing water from the first tank, through its drain, into the water inlet of the second tank; and plate means within each tank and located throughout the length thereof, for increasing the grazing area for abalone.

17. An abalone farming system as set forth in claim 16, wherein the plate means forms a lattice-like structure within the tank, for dividing the tank into distinct cells.

18. An abalone farming system as set forth in claim 17, including divider plates arranged within each tank, for restricting migration of abalone along the length of the tank.

19. An abalone farming system as set forth in claim 16, wherein the first and second elongated tanks are stacked vertically along a common plane.

20. An abalone farming system as set forth in claim 19, wherein the vertically stacked elongated tanks are placed within a shelter to form an abalone hatchery, and wherein a second similar plurality of vertically stacked elongated tanks are placed out-of-doors to provide a growout area for abalone transferred from the hatchery.

21. An abalone farming system as set forth in claim 20, wherein seawater provided for the hatchery is filtered and sterilized, and wherein the seawater provided for the growout area is unfiltered and unsterilized.

22. An abalone farming system as set forth in claim 16, including a water supply nozzle at the first end of the first tank, wherein water received into the first tank flows substantially the entire length thereof to the drain, whereat it cascades downwardly to the second tank.

23. An abalone farming system as set forth in claim 22, wherein the water supply nozzle includes means for aerating the water upon its discharge from the nozzle, the aerating means including a fan sprayer.

24. An abalone farming system as set forth in claim 16, including a standpipe associated with the drain for controlling a level of water within the first tank.

25. An abalone farming system as set forth in claim 16, including a system for conditioning seawater prior to its being fed into the first tank, wherein the conditioning system includes means for filtering the seawater and sterilizing the seawater with ultraviolet light.

26. An abalone farming system as set forth in claim 16, including means for controlling the temperature of the water within the tanks.

27. An abalone farming system as set forth in claim 16, including means for recycling water from the second end of the second tank, back to the first end of the first tank, to create a water feedback loop.

28. An abalone farming system as set forth in claim 16, including means extending the length of each tank, for aerating water within the tank.

29. An abalone farming system, comprising:

a hatchery which includes a first set of vertically stacked, horizontally elongated tanks having a water supply at a first end of a top tank;

a growout area which includes a second set of vertically stacked, horizontally elongated tanks having a water supply at a first end of a top tank;

means extending the length of each tank for aerating water within the tank;

a seawater inlet for providing seawater to the water supplies of the first and second sets of vertically stacked, horizontally elongated tanks;

an outlet for discharging seawater from the first and second sets of vertically stacked, horizontally elongated tanks; and a recirculation system which permits discharge seawater to be selectively reclaimed at the outlet and fed back to the water supply of the hatchery.

30. An abalone farming system as set forth in claim 29, wherein each set of vertically stacked, horizontally elongated tanks includes a first horizontally extending elongated tank having a first end and a second end, wherein a drain is provided through the second end, a second horizontally extending elongated tank stacked vertically relative to the first tank along a common plane, the second tank having a first end and a second end, and means for directing water from the first tank, through its drain, into the second tank at its first end.

31. An abalone farming system as set forth in claim 30, including a water supply nozzle at the first end of the first tank, wherein water received into the first tank flows substantially the entire length thereof to the drain whereat it cascades downwardly to the second tank, wherein the water supply nozzle includes means for aerating the water upon its discharge from the nozzle, the aerating means including a fan sprayer, and a standpipe associated with the drain for controlling the level of water within the first tank.

32. An abalone farming system as set forth in claim 29, including plate means within each tank and located throughout the length thereof, for increasing the grazing area for abalone.

33. An abalone farming system as set forth in claim 32, wherein the plate means within the second set of tanks forms a lattice-like structure within the tank, for dividing the tank into distinct cells, the plate means including divider plates arranged within each tank, for restricting migration of abalone along the length of the tank.

34. An abalone farming system as set forth in claim 29, including means for controlling the temperature of water within the tanks, wherein seawater provided for the hatchery is filtered and sterilized, and wherein the seawater provided for the growout area is unfiltered and unsterilized.

35. An abalone farming system as set forth in claim 29, including a system for conditioning the seawater fed to the hatchery, wherein the conditioning system includes means for filtering the seawater and sterilizing the seawater with ultraviolet light.

* * * * *